United States Patent
Spicer et al.

(10) Patent No.: US 9,929,680 B2
(45) Date of Patent: Mar. 27, 2018

(54) CONFORMABLE ELECTROADHESIVE HOLDING DEVICE

(71) Applicant: GM GLOBAL TECHNOLOGY OPERATIONS LLC, Detroit, MI (US)

(72) Inventors: John Patrick Spicer, Plymouth, MI (US); Jianying Shi, Oakland Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 320 days.

(21) Appl. No.: 14/746,091

(22) Filed: Jun. 22, 2015

(65) Prior Publication Data

US 2016/0056734 A1 Feb. 25, 2016

Related U.S. Application Data

(60) Provisional application No. 62/038,989, filed on Aug. 19, 2014.

(51) Int. Cl.
*H02N 13/00* (2006.01)

(52) U.S. Cl.
CPC .................. *H02N 13/00* (2013.01)

(58) Field of Classification Search
CPC .................. H02N 13/00; H01L 21/67103
USPC ........................................... 361/234
See application file for complete search history.

(56) References Cited

U.S. PATENT DOCUMENTS

| 9,623,570 | B1* | 4/2017 | Krahn | B25J 15/0023 |
| 9,674,949 | B1* | 6/2017 | Liu | H05K 1/0283 |
| 2010/0217436 | A1 | 8/2010 | Jones et al. | |
| 2013/0106127 | A1 | 5/2013 | Lipson et al. | |
| 2014/0104744 | A1* | 4/2014 | Prahlad | B25J 15/0085 361/234 |

FOREIGN PATENT DOCUMENTS

| DE | 102012215513 A1 | 3/2014 |
| JP | 2013220491 A | 10/2013 |
| JP | 2013220492 A | 10/2013 |

* cited by examiner

*Primary Examiner* — Dharti Patel
(74) *Attorney, Agent, or Firm* — Quinn IP Law

(57) ABSTRACT

A gripping device is described, and includes a holder including a base and a conformable jamming element having an electroadhesive element on a surface thereof and a controllable voltage source that is electrically connected to the electroadhesive element.

19 Claims, 2 Drawing Sheets

CONFORMABLE ELECTROADHESIVE HOLDING DEVICE

CROSS-REFERENCE TO RELATED APPLICATIONS

This application claims the benefit of U.S. Provisional Application No. 62/038,989, filed Aug. 19, 2014, which is hereby incorporated by reference in its entirety.

TECHNICAL FIELD

This disclosure relates to workpiece-gripping devices for fixtures, tooling, material handling and robotic end-effectors.

BACKGROUND

Universal grippers for tooling, fixtures and robotic end-effectors advantageously employ holding devices that attach to a variety of arbitrarily-shaped workpieces for movement and placement during manufacturing and assembly processes. Universal grippers may employ some form of external power to effect gripping and release, including vacuum-based suction grippers and anthropomorphic, multi-digit grippers for grasping and manipulating workpieces.

Passive universal grippers require minimal grasp planning and include components that passively conform to unique workpiece geometries, giving them the ability to grip widely varying workpieces without readjustment. Passive universal grippers may be simple to use and may require minimal visual preprocessing of their environment. However, an ability to grip many different workpieces often renders passive universal grippers inferior at gripping any one workpiece in particular.

One passive, universal jamming gripper employs granular materials contained in a pliable membrane that conforms to a surface of a workpiece by applying a jamming force. Such operation exploits temperature-independent fluid-like characteristics of the granular materials, which can transition to a solid-like pseudo-phase with application of a vacuum inside the pliable membrane. This type of gripper employs static friction from surface contact, capture of the workpiece by conformal interlocking, and vacuum suction when an airtight seal is achieved on some portion of the workpiece surface. A jamming gripper employs static friction from surface contact, capture of workpiece by interlocking, and vacuum suction to grip different workpieces of varying shape, weight and fragility in an open loop configuration without employing grasp planning, vision, or sensory feedback.

SUMMARY

A gripping device is described, and includes a holder including a base and a conformable jamming element having an electroadhesive element on a surface thereof and a controllable voltage source that is electrically connected to the electroadhesive element.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
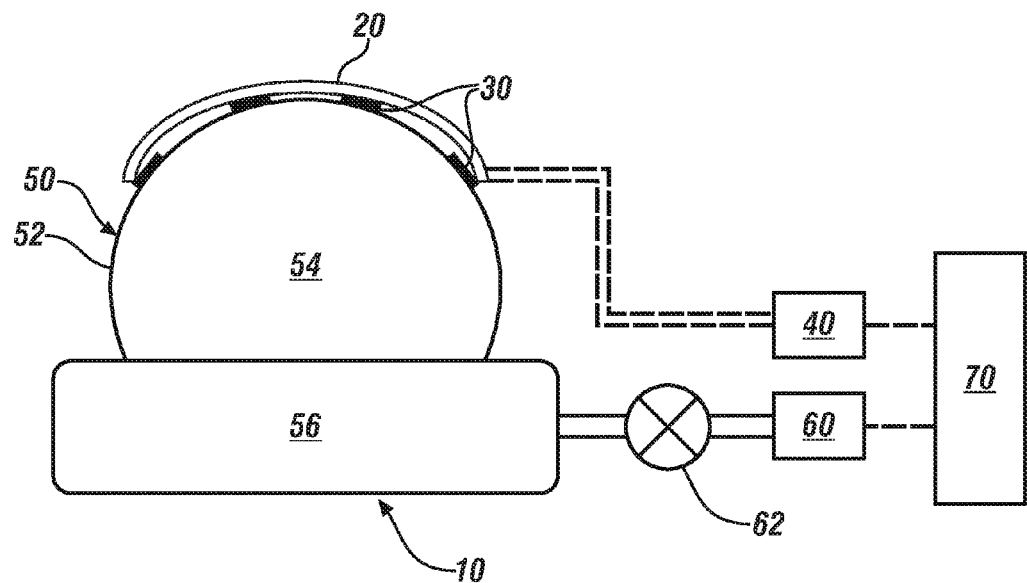
FIG. 1 schematically illustrates a two-dimensional side view of a holding device including a conformable jamming element having a controllable electroadhesive element secured onto a surface thereof, in accordance with the disclosure.

Referring now to the drawings, wherein the depictions are for the purpose of illustrating certain exemplary embodiments only and not for the purpose of limiting the same, FIG. 1 schematically illustrates a two-dimensional side view of a conformable holding device 10 including a controllable electroadhesive element 20 secured onto a surface of a jamming element 50. The holding device 10 may be employed on an end effector of a robotic arm to controllably grip or otherwise hold onto a workpiece or assist in holding onto a workpiece to restrain the workpiece at a location or carry the workpiece to another location.

The jamming element 50 includes an air-impermeable pliable membrane 52 that sealably attaches to a base 56 and contains granular filling material 54. The base 56 attaches to an end-effector of a robotic arm in one embodiment. Suitable materials from which the membrane 52 may be fabricated include latex, vinyl, coated fabric and metal foil, among others. The membrane material is air-impermeable and is preferably resistant to tearing, e.g., by using multiple layers. Suitable material for the granular filling material 54 includes cracked corn, ground coffee and pulverized plastics among others. The base 56 includes a fluid conduit that connects to a controllable pressure source 60. The pressure source 60 generates negative pressure (vacuum) within the jamming element 50 in response to a first control signal to effect gripping of a workpiece, and permits vacuum release or generates positive pressure within the jamming element 50 in response to a second, subsequent control signal to effect release of the workpiece. In one embodiment, the pressure source 60 fluidly couples to the jamming element 50 through a controllable shut-off valve 62, wherein the shut-off valve 62 is open while the pressure source generates the vacuum within the jamming element 50 to effect gripping of the workpiece, is closed while the gripping is requested, and is re-opened to permit vacuum release within the jamming element 50 to effect release of the workpiece.

The controllable electroadhesive element 20 is preferably secured onto a surface of the jamming element 50 employing a plurality of re-usable attachment devices 30, e.g., hook and loop fasteners. Employing re-usable attachment devices 30 permits removal and replacement of the electroadhesive element 20. Alternatively, the controllable electroadhesive element 20 may be secured directly onto a surface of the jamming element 50 by incorporation into the filled membrane 52. The electroadhesive element 20 electrically connects to an electroadhesion activation controller 40 that controls activation thereof. A system controller 70 communicates with the activation controller 40 and the pressure source 60 to effect attachment and detachment to the workpiece.

The jamming element 50 operates by contacting and conforming to the shape of the workpiece when urged against the workpiece. A vacuum is applied to vacuum-harden the filled membrane 52 to rigidly grip the workpiece. Simultaneously or immediately subsequently, the electroadhesion activation controller 40 activates the electroadhesive element 20, which electrostatically binds the workpiece to a portion of the membrane 52 that is contiguous to the workpiece. After work has been performed on the workpiece or it has been transported to another location, one or more bursts of positive pressure may be applied to reverse the fluid-like-to-solid-like phase transition, i.e., reverse the jamming. The electroadhesion activation controller 40 deactivates the electroadhesive element 20 to forcibly release the workpiece and return and thus reset the filled membrane 52 to a deformable, ready state.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated memory and storage devices (read only, programmable read only, random access, hard drive, etc.) executing one or more software or firmware programs or routines, combinational logic circuit(s), input/output circuit(s) and devices, signal conditioning and buffer circuitry and other components to provide a described functionality. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic routines to control operation of actuators. Routines may be executed at regular intervals. Alternatively, routines may be executed in response to occurrence of an event, such as an external command. Communications between controllers and between controllers, actuators and/or sensors may be accomplished using a direct wired link, a networked communications bus link, a wireless link or any another suitable communications link.

Figure 2:
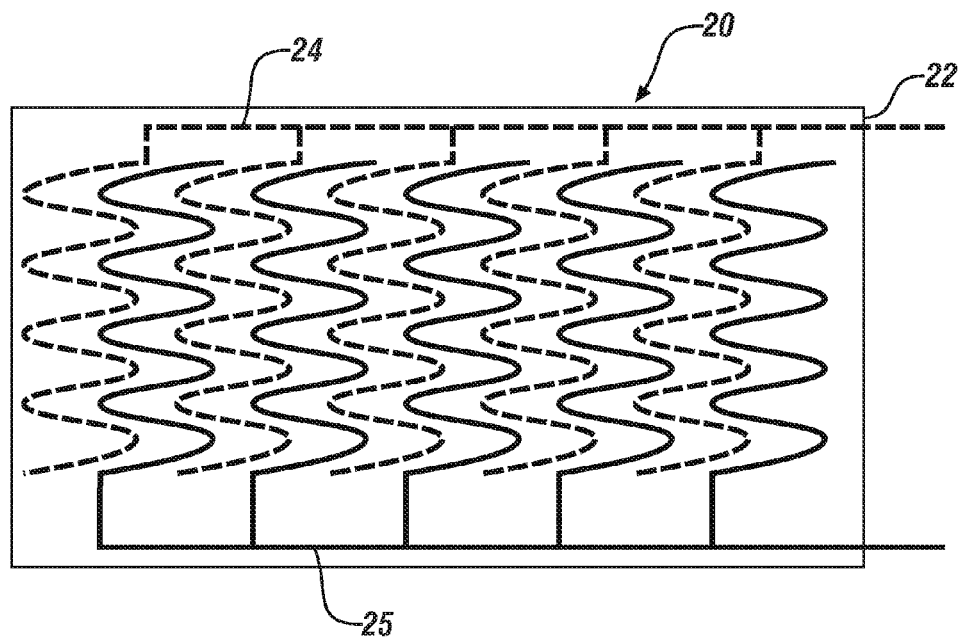
FIG. 2 schematically shows a plan view of the electroadhesive element, including a pliable substrate on which a plurality of flexible electrically conductive electrode pairs are embedded, in accordance with the disclosure.

FIG. 2 schematically shows a plan view of one embodiment of the electroadhesive element 20, including a pliable substrate 22 in which a plurality of flexible electrically conductive electrode pairs 24, 25 are embedded. Alternatively, the plurality of flexible electrically conductive electrode pairs 24, 25 may be embedded directly into the material of the filled membrane 52 without employing a pliable substrate 22. The electrode pairs 24, 25 are fabricated to permit elastic movement in three dimensions such that they conform with the jamming element 50 to the workpiece, and are serpentine in one non-limiting embodiment. The pliable substrate 22 is fabricated from a suitable dielectric material. The electrode pairs 24, 25 are fabricated from flexible electrically-conductive material that may include high-tensile strength metal, stretchable wire, liquid wire, helically-woven wire or another suitable material. The electrode pairs 24, 25 are also arranged onto the pliable substrate 22 in a manner that effects electroadhesion under specific conditions. When alternate positive and negative charges are induced on the electrode pairs 24, 25, the resulting electric field creates opposed charges on the surface of the substrate 22 that may facilitate adhesion to the workpiece. Such adhesion applies to a variety of workpiece materials, including, e.g., metals, carbon fiber, plastics, glass, cardboard and organic materials, among others.

Electroadhesion refers to the mechanical coupling of two objects, e.g., the electroadhesive device 20 and a workpiece, using electrostatic forces. Electroadhesion holds adjacent surfaces of the objects together or increases the effective traction or friction between two surfaces due to electrostatic forces created by an electric field that is generated in the electroadhesive device 20. Electrostatic adhesion voltage refers to a voltage that produces a suitable electrostatic force to couple the adjacent surfaces, e.g., the electroadhesive device 20 coupled to a workpiece. The electrode pairs 24, 25 form electrical conductors in close proximity that generate alternating patterns of induced current flow. The alternating patterns of induced current flow may be generated by fabricating the electrode pairs 24, 25 in alternating directions, e.g., a zigzag pattern or a spiral pattern. The electrode pairs 24, 25 are embedded in the dielectric substrate 22 so that the electric field between each of the electrode pairs 24, 25 induces coulomb charges in the dielectric substrate 22. An increase in the electric field (E) results in an increase in charge density (D). When the electroadhesive device 20 is brought in contact with a workpiece, an opposite charge is established in the workpiece by the same electric field. Since the charges are opposite, they create an attractive force (F) between them that is based upon electrical permittivity of the dielectric substrate 22. Since the material of the surface of the electroadhesive device 20 may differ from the material of the workpiece, differences in permittivity (epsilon) of the two materials must be accounted for in determining magnitude of attractive force. Distance between the dielectric substrate 22 and the workpiece must also be accounted for, with such distance being the thickness of the dielectric substrate 22 covering the electroadhesive device 20, which acts as an electrical insulator. Thus, a magnitude of gripping force is determined by permittivity (epsilon) in the material of the dielectric substrate 22 and in the material of the workpiece. Thus, the holding force will vary for different workpiece materials and is preferably accounted for in design of the electroadhesive device 20. Preferred design parameters include a relatively high voltage, a high contact surface area of contact, and a minimal thickness of the dielectric substrate 22.

The minimum voltage needed for the electroadhesive element 20 varies in relation to factors related to the surface area of the electroadhesive element 20, material conductivity and spacing of electrode pairs 24, 25, the material of the dielectric substrate 22, the surface material of the workpiece, the presence of any disturbances to electroadhesion such as dust, other particulates or moisture, the weight of any objects being supported by the electroadhesive force, three-dimensional compliance of the electroadhesive device 20, the dielectric and resistivity properties of the workpiece, and/or the relevant gaps between electrode pairs 24, 25 and a surface of the workpiece. In one embodiment, the electrostatic adhesion voltage includes a differential voltage between the electrode pairs 24, 25 that is between about 500 volts and about 15 kilovolts. Even lower voltages may be used in micro applications. In one embodiment, the differential voltage is between about 2 kilovolts and about 5 kilovolts. Voltage for one of the electrode pair 24, 25 may be zero. Alternating positive and negative charges may also be applied to adjacent electrode pairs 24, 25. The voltage on a single electrode may be varied in time, and in particular may be alternated between positive and negative charges so as to not develop substantial long-term electrostatic charging of the workpiece. The resultant holding forces will vary with the specifics of a particular electroadhesive device 20, the material it adheres to, any particulate disturbances, surface roughness, and so forth. In general, electroadhesion as described herein provides a wide range of holding pressures, generally defined as the attractive force applied by the electroadhesive device divided by the area thereof in contact with the workpiece.

The actual electroadhesion forces and pressure will vary with design and other factors. In one embodiment, electroadhesive device 20 provides electroadhesive attraction pressures between about 0.7 kPa (about 0.1 psi) and about 70 kPa (about 10 psi), although other amounts and ranges are certainly possible. The amount of force needed for a particular application may be readily achieved by varying the area of the contacting surfaces, varying the applied voltage, and/or varying the distance between the electrodes and workpiece surface, although other relevant factors may also be manipulated as desired.

Figure 3:
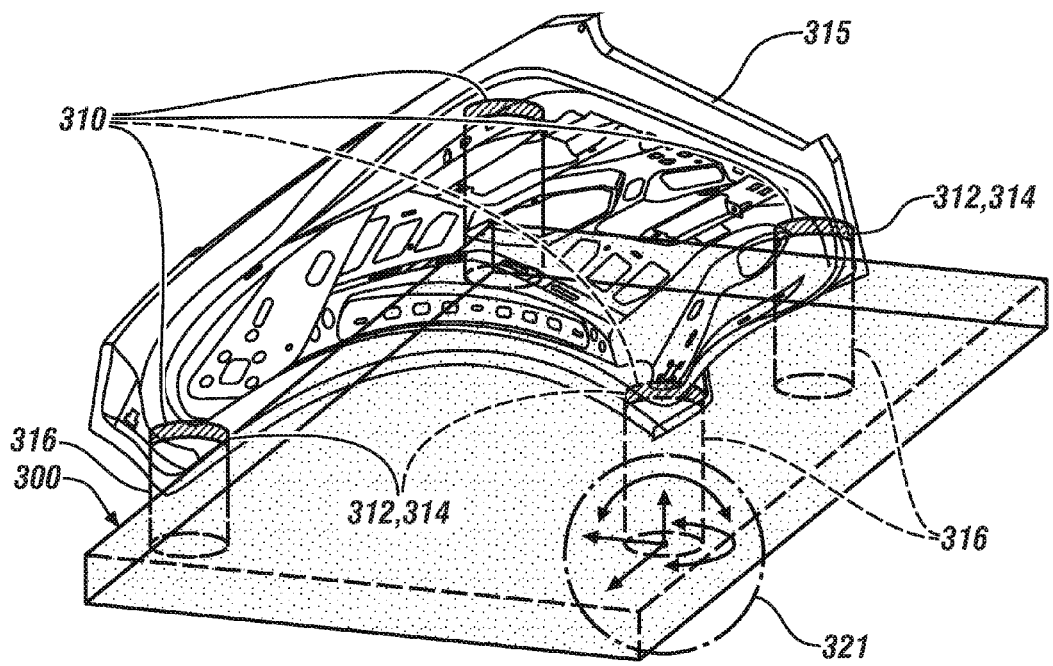
FIG. 3 schematically shows a three-dimensional partially translucent isometric view of a workpiece holder including a conformable jamming element having a controllable electroadhesive element secured onto a surface thereof and configured to conformally interface with a workpiece at a plurality of gripping locations with the workpiece secured on top of the holder, in accordance with the disclosure.

FIG. 3 schematically shows a three-dimensional isometric view of a workpiece holder 300 that may be in the form of a fixture, tooling or a robotic end-effector that has been configured to conformally interface with a workpiece 315 at a plurality of gripping locations. The holder 300 includes a plurality of holding devices 310 analogous to the holding device 10 described with reference to FIGS. 1 and 2. In one embodiment, the holder 300 includes a single one of the holding devices 310. Each of the holding devices 310 includes a conformable jamming element 312 having a controllable electroadhesive element 314 secured onto a surface thereof and configured to conformally interface with the workpiece 315 when activated by a controller. As shown the workpiece 315 rests on top of the holder 300 and the workpiece 315 is secured thereto by electroadhesive holding force applied to the conformed surfaces of the plurality of holding devices 310. The holding devices 310 are all depicted as orthogonal to a planar surface of the holder 300, but it is appreciated that the holding devices 310 may be arranged in any suitable orientation with reference to the holder 300. Furthermore, as indicated by element 321, individual ones of the holding devices 310 may be moveable to different positions on the holder 300, including being configured for xy-plane translation on the surface of the holder 310, extension in a z-direction, or rotation about an x-axis, a y-axis, and/or a z-axis, i.e., pitch, yaw and/or roll rotations, thus having as many as six degrees of freedom of motion to accommodate and adapt to workpieces 315 having different geometries. The chosen degrees of freedom may be any combination of x,y,z translations and/or pitch/yaw/roll rotations.

Figure 4:
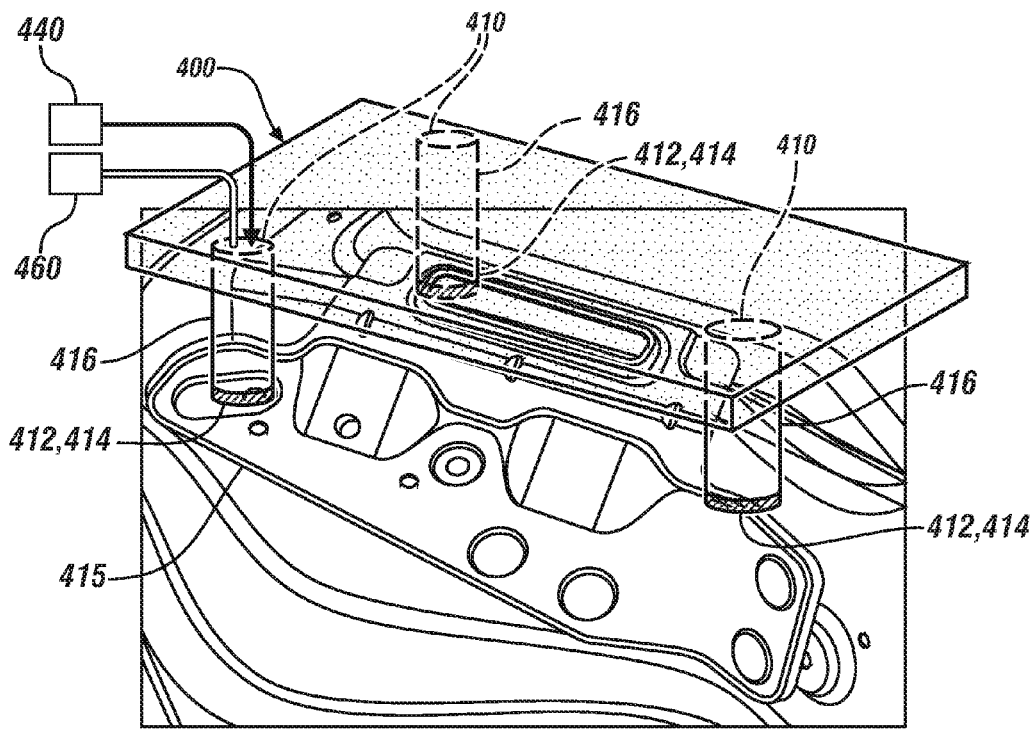
FIG. 4 schematically shows a three-dimensional partially translucent isometric view of a workpiece holder including a conformable jamming element having a controllable electroadhesive element secured onto a surface thereof and configured to conformally interface with a workpiece at a plurality of gripping locations with the workpiece secured below the holder, in accordance with the disclosure.

FIG. 4 schematically shows a three-dimensional isometric view of a workpiece holder 400 that may be in the form of a fixture, tooling or a robotic end-effector that has been configured to conformally interface with a workpiece 415 at a plurality of gripping locations. The holder 400 includes a plurality of conformable holding devices 410 analogous to the holding device 10 described with reference to FIGS. 1 and 2. As such, each holding device includes a conformable jamming element 412 having a controllable electroadhesive element 414 secured onto a surface thereof and configured to conformally interface with a workpiece 415 when controlled by a controller. As shown the workpiece 415 suspends from and adheres to the holder 400 with the workpiece 415 secured thereto by electroadhesive holding force applied to the conformed surfaces of the plurality of holding devices 410. The holding devices 410 are depicted as orthogonal to a planar surface of the holder 400, but it is appreciated that the holding devices 410 may be arranged in any suitable orientation with reference to the holder 400.

Each embodiment of the holder 400 described herein including one or a plurality of conformable electroadhesive holding devices 410 operates as follows. The holder 400 is attached to a distal end of a robotic arm as an element of an end-effector. Initially each holding device 410 is electrically de-energized and no vacuum is applied. The robotic arm is controlled to urge the holder 400 against a portion of the workpiece 415 by a force having a magnitude that is sufficient to conform the holding device to the surface of the workpiece 415. Pressure source 460 is activated to generate negative pressure (vacuum) within the jamming element 412 to jam the particles to maintain the conformed shape and may provide some holding force for external features. The activation controller 440 energizes the electroadhesive element 414 to generate electrostatic holding force. The holder 400 may be transported by the robotic arm to a desired location to execute work on the workpiece 415. After the work is completed, the vacuum is released and the electroadhesive element 414 is de-energized to release the workpiece 415. The configuration enables use of any suitable workpiece grip orientation, including internal, flat and external grips while conforming to the workpiece shape and workpiece cavities. The configuration is readily reconfigurable to different workpiece geometries.

An embodiment of a holder including one or a plurality of conformable electroadhesive holding devices provides a gripper element where the gripper may have one or more such elements to enable gripping a workpiece or supporting the workpiece while providing sufficient accessibility to enable welding. A workpiece holder including one or a plurality of conformable electroadhesive holding devices provides a gripper element wherein the gripper may have one or more such elements to enable gripping of a workpiece while providing sufficient accessibility to enable welding or other work to be performed on or with the workpiece. One or more of the holding devices can be repositioned/reconfigured to a different location to accommodate different workpieces having differing geometries. One or more of the holding devices can be repositioned or reconfigured to a different location to accommodate different workpieces having differing geometries. A workpiece holder including electroadhesive holding devices provides a gripper element that is able to effect an external grip by folding around and conforming to a portion of a workpiece and through use of electroadhesive force. A workpiece holder including electroadhesive holding devices provides a gripper element that is able to effect an internal or flat grip to a portion of a workpiece through use of electroadhesive force. The workpiece holder including electroadhesive holding devices provides a gripper element that is able to effect a combination of external, internal and/or flat grips to a portion of a workpiece through use of electroadhesive force. The workpiece holder may be applied in any material handling situation, including but not limited to manufacturing and assembly processes, material handling and conveyancing, measurement, testing and the like.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A gripping device, comprising:
a holder including a base and a conformable jamming element having an electroadhesive element on a surface thereof, wherein the conformable jamming element includes a closed impermeable pliable membrane containing a granular filling material;
the base including a fluid conduit that connects to a pressure source, wherein the pressure source generates a negative pressure in the jamming element in response to a first control signal; and
a controllable voltage source electrically connected to the electroadhesive element.

2. The device of claim 1, wherein the electroadhesive element comprises a pliable substrate embedded with a plurality of flexible electrically conductive electrode pairs.

3. The device of claim 2, wherein each flexible electrically conductive electrode pair has a serpentine arrangement.

4. The device of claim 2, wherein the pliable substrate is fabricated from dielectric material.

5. The device of claim 2, wherein the electrode pairs are fabricated from one of a high-tensile strength metal, stretchable wire, liquid wire and helically-woven wire.

6. The device of claim 1, wherein the controllable voltage source electrically connected to the electroadhesive element comprises the controllable voltage source electrically connected to the electrode pairs; and wherein the controllable voltage force is energized to induce alternate positive and negative electrical charges on the electrode pairs to generate opposed charges on the surface of the electroadhesive element.

7. The device of claim 6, wherein the controllable voltage force is energized to induce the alternate positive and negative electrical charges on the electrode pairs to generate an electroadhesive holding force on the surface of the electroadhesive element.

8. The device of claim 6, further comprising the controllable voltage force is de-energized to release the electroadhesive force on the surface of the electroadhesive element.

9. The device of claim 1, wherein the electroadhesive element on a surface of the jamming element further comprises the electroadhesive element secured onto the surface of the jamming element employing a plurality of re-usable attachment devices.

10. The device of claim 1, wherein the pressure source generates the negative pressure in the jamming element in response to the first control signal in conjunction with the controllable voltage force energized to induce alternate positive and negative electrical charges on the electrode pairs to generate an electroadhesive holding force on the surface.

11. A device for gripping a portion of a workpiece, comprising:
a holder including a base and a conformable jamming element having an electroadhesive element on a surface thereof;
the conformable jamming element attached to the base and including a closed impermeable pliable membrane containing a granular filling material;
a controllable pressure device fluidly coupled to the conformable jamming element;
a controllable voltage source electrically connected to the electroadhesive element; and
a controller communicating with the controllable pressure device and the controllable voltage source;
wherein the electroadhesive element grips the portion of the workpiece in response to commands from the controller to the controllable pressure device and the controllable voltage source.

12. The device of claim 11, wherein the electroadhesive element comprises a pliable substrate embedded with a plurality of flexible electrically conductive electrode pairs.

13. The device of claim 11, wherein each flexible electrically conductive electrode pair has a serpentine arrangement fabricated from one of a high-tensile strength metal, stretchable wire, liquid wire and helically-woven wire.

14. The device of claim 11, wherein the controllable voltage source electrically connected to the electroadhesive element comprises the controllable voltage source electrically connected to electrode pairs; and wherein the controllable voltage force is energized to induce alternate positive and negative electrical charges on the electrode pairs to generate opposed charges on the surface of the electroadhesive element.

15. The device of claim 14, wherein the controllable voltage force is energized to induce the alternate positive and negative electrical charges on the electrode pairs to generate an electroadhesive holding force on the surface of the electroadhesive element.

16. The device of claim 15, further comprising the controllable voltage force is de-energized to release the electroadhesive force on the surface of the electroadhesive element.

17. The device of claim 11, wherein the conformable jamming element attached to the base includes a closed impermeable pliable membrane containing a granular filling material;
and further comprising the base including a fluid conduit that connects to a pressure source, wherein the pressure source generates a negative pressure in the jamming element in response to a first control signal.

18. The device of claim 11, wherein the conformable jamming element having the electroadhesive element on the surface thereof comprises the electroadhesive element secured directly onto a surface of the closed impermeable pliable membrane.

19. A holder for gripping a workpiece, comprising:
a plurality of conformable holding devices, each holding device including a base and a conformable jamming element having an electroadhesive element secured onto a surface thereof, wherein each conformable jamming element attaches to its base and includes a closed impermeable pliable membrane containing a granular filling material;
a controllable pressure device fluidly coupled to the conformable jamming elements;
a controllable voltage source electrically connected to the electroadhesive elements; and
a controller communicating with the controllable pressure device and the controllable voltage source;

wherein the electroadhesive elements grip portions of the workpiece in response to commands from the controller to the controllable pressure device and the controllable voltage source; and wherein one of the conformable holding devices has freedom of motion on the holder that is adaptable to the workpiece.

\* \* \* \* \*